United States Patent [19]

Woodruff

[11] Patent Number: 5,615,515
[45] Date of Patent: Apr. 1, 1997

[54] DEVICE FOR THE CONTROL OF MICE AND OTHER RODENTS

[76] Inventor: Marie A. Woodruff, 1331 Summit La., Mountainside, N.J. 07092

[21] Appl. No.: 467,078

[22] Filed: Jun. 6, 1995

[51] Int. Cl.[6] .......................... A01M 23/06; A01M 23/02
[52] U.S. Cl. ...................................................... 43/63; 43/60
[58] Field of Search ................................... 43/58, 60, 61, 43/63, 64, 65, 67, 69

[56] References Cited

U.S. PATENT DOCUMENTS

| | | | |
|---|---|---|---|
| 2,867,938 | 1/1959 | Niemeyer | 43/63 |
| 4,550,523 | 11/1985 | Spiller | 43/61 |
| 4,554,758 | 11/1985 | Molloy | 43/61 |
| 4,557,067 | 12/1985 | Ha | 43/61 |
| 4,578,892 | 4/1986 | Melton | 43/60 |
| 4,744,170 | 5/1988 | Chow | 43/61 |
| 4,829,700 | 5/1989 | Ha | 43/61 |
| 5,502,918 | 4/1996 | Oviatt | 43/61 |

Primary Examiner—Joseph J. Hail, III
Assistant Examiner—Jay A. Stelacone

[57] ABSTRACT

A device for controlling mice and other rodents includes a tubular housing having an opened rear end, a closed front end and a spring element for selectively closing the rear end. The housing is mounted at an inclined angle relative to a supporting platform which opposes the force of the spring element and maintains the rear end of the housing in its opened position when the housing is mounted on the supporting platform. An attractant induces mice or other rodents into the housing which, as a result of the weight of the rodent, pivots relative to the supporting platform resulting in disengagement of the rear end of the housing and the supporting platform. Upon disengagement, the spring element closes the rear end of the housing entrapping the rodent therein. Breathing openings covered by a removable seal can be provided in the housing to dispose of the trapped rodent in a living state.

20 Claims, 2 Drawing Sheets

DEVICE FOR THE CONTROL OF MICE AND OTHER RODENTS

BACKGROUND OF THE INVENTION

The present invention is directed to devices for controlling and trapping mice and other rodents, commonly referred to as "mouse traps".

Known mousetraps are disadvantageous in many respects. Many of the conventional devices kill and mutilate the trapped rodent, creating unsanitary conditions and requiring unpleasant clean-up activities. Moreover, the trapped rodent is not concealed but remains in open view in its mutilated condition. The conventional devices generally include moving mechanical parts which increase the complexity of manufacture, and correspondingly increase the cost of the devices to the consumer.

It is a primary object of the present invention to provide methods and apparatus for trapping mice and other rodents, in a manner which overcomes the disadvantages of the known prior art devices. The methods and apparatus provided by the present invention permit entrapment of the rodent without physical mutilation thereof; entrap the rodent in a sealed container thereby concealing the entrapped rodent and avoiding direct contact therewith; permits disposal of the entrapped rodent in a living state; and contains no complicated mechanical parts thereby facilitating the manufacture of the device and reducing the cost thereof.

Other objects and advantages of the methods and apparatus in accordance with the present invention will become apparent from the following discussion.

SUMMARY OF THE INVENTION

The present invention provides methods and apparatus for entrapping mice and other rodents in a sealed container which eliminates mutilation, direct sight, and direct contact with the entrapped rodent. The device includes a generally tubular shaped container or housing having a rear opened end through which the rodent will pass, and an opposed closed end. An attractant is provided, preferably at the forward closed end of the housing, for inducing rodents to enter the opened end of the housing. The housing further includes resilient means biased to close the opened end of the housing unless an opposing force is provided to overcome the resilient bias.

The housing is removably mounted on a supporting base such that the rear opened end is engaged by the base in a manner such that the resilient bias is overcome to maintain the rear end in its opened position when the housing is mounted to the base. The housing is oriented at an upwardly inclined angle relative to the base in a direction from the opened end of the housing towards the closed end of the housing. When a rodent is attracted into the opened end of the housing, the weight of the rodent causes the forward portion of the upwardly inclined housing to rotate downwardly towards the base along a pivot region defined within the housing. This results in separation of the housing from the supporting base as the open end of the housing is disengaged from retaining means on the base. The opposed force exerted by the base to overcome the resilient bias on the opened end of the housing is eliminated, and the resilient means closes the rear end of the housing to result in a completely sealed unit. The entrapped rodent is concealed from view, and can be disposed of without direct human contact by disposing of the housing. The rodent is not mutilated, and at the selection of the user, breathing openings defined in the housing can be unsealed to dispose of the entrapped rodent in a living state.

DESCRIPTION OF THE BEST MODES FOR CARRYING OUT THE INVENTION

FIGS. 1–8 illustrate the preferred embodiments of the methods and appartus for controlling and entrapping mice and other rodents in accordance with the present invention.

Figure 1:
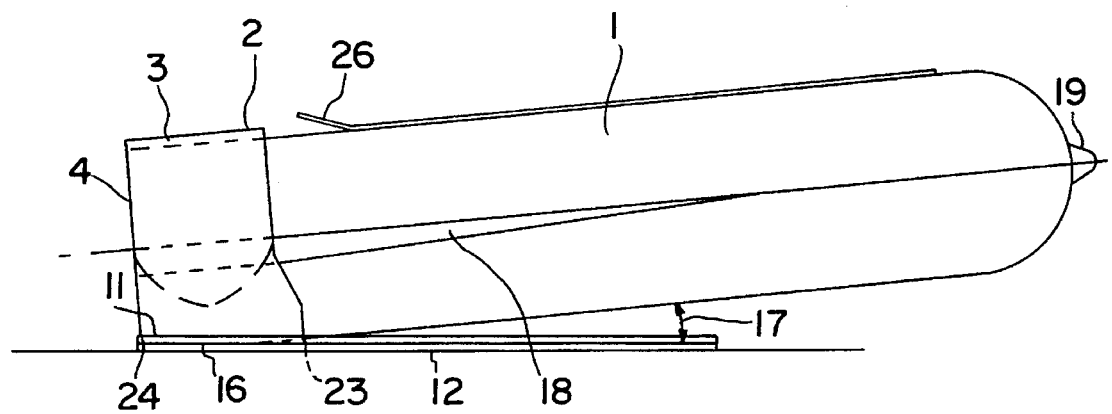
FIG. 1 of the drawing illustrates a side elevational view of a device in accordance with the present invention in its operative position prior to actuation.
Figure 2:
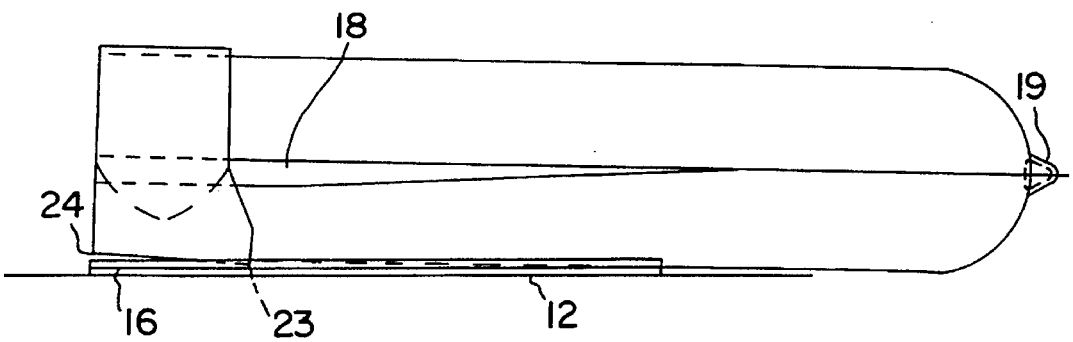
FIG. 2 illustrates the device of FIG. 1 after it has been actuated.

Referring first to FIGS. 1–2, a housing, generally illustrated by reference numeral 1, is provided in a tube-shaped configuration having a rear opened end designated by reference numeral 4. The housing is movably mounted on a retainer channel or supporting plate 12, at an upwardly inclined angle illustrated by reference numeral 17 in FIG. 1. (As will be discussed below, in the preferred embodiment of the invention, the housing is removably mounted to the supporting means.) The opened end 4 of the housing 1 includes resilient means generally illustrated by a spring 2 permanently affixed to the top half section of the housing 1, which is generally designated by the reference numeral 3. The spring is mounted to the upper half 3 of the housing 1 proximate to the opened rear end 4 by conventional bonding methods, and the spring is biased in a lateral direction to exert a force tending to close the opened end 4 of the housing. Sides 11 of the spring abut against upwardly extending sides of the supporting plate or retainer channel 12 as the spring and the housing 1 are supported atop the upper surface 16 of the retainer channel 12. The rear edge 24 of the spring is maintained in a flexed position by the upwardly extending sides of the retainer channel 12 to oppose the resilient force exerted by the spring on the housing to maintain the end 4 of the housing 1 in its opened position. As will be discussed below, the spring 2 also includes angled outer edges to permit the end 24 of the spring to be removably received within the retainer channel 12 so as to orient the housing 1 in the upwardly inclined direction relative to the retainer channel 12, as illustrated by FIG. 1. As also shown in this drawing, the closed forward end of the housing 1 includes a packet 19 for storing an attractant material; a flange 18 extending horizontally around the periphery of the housing 1 proximate to its center line; and a strip of removable sealing tape 26 provided across the upper surface of housing 1 to selectively unseal at least one opening defined in the upper surface of the housing. These latter features illustrated by FIG. 1 will be further discussed below.

FIG. 2 of the drawing illustrates the housing 1 and the retainer channel 12 of the device illustrated by FIG. 1, after the device has been actuated to entrap a mouse or other rodent. The weight of an animal entering the open end 4 of the housing 1 causes the housing to pivot downwardly relative to the retainer channel along a pivot region illustrated by reference numeral 23 in FIGS. 1 and 2. The rotational movement of the housing relative to the retainer channel causes the rear end 24 of the spring 2 to be lifted above the base and opposed sidewalls of the retaining channel 12, thereby removing the opposition to the resilient force of the spring, and causing the housing to be physically disengaged separated and removed from the retaining channel. The spring unflexes as a result of the removal of the opposing force provided by the retainer channel, causing the rear end 4 of the housing 1 to become sealed and closed. The mouse or other rodent is entrapped within the closed tubular housing 1, which is no longer engaged with the retaining channel, but is lying sustantially flat thereon. The housing can be disposed of by removing it from the retaining channel, and the mouse other other rodent entrapped therein may be disposed of in a living state by removing the strip 26 to expose at least one breathing opening defined in the housing 1. In either case, the entrapped animal is not mutiliated, is out of view because it is concealed within the sealed housing, and can be disposed of without direct contact therewith.

Figure 3:
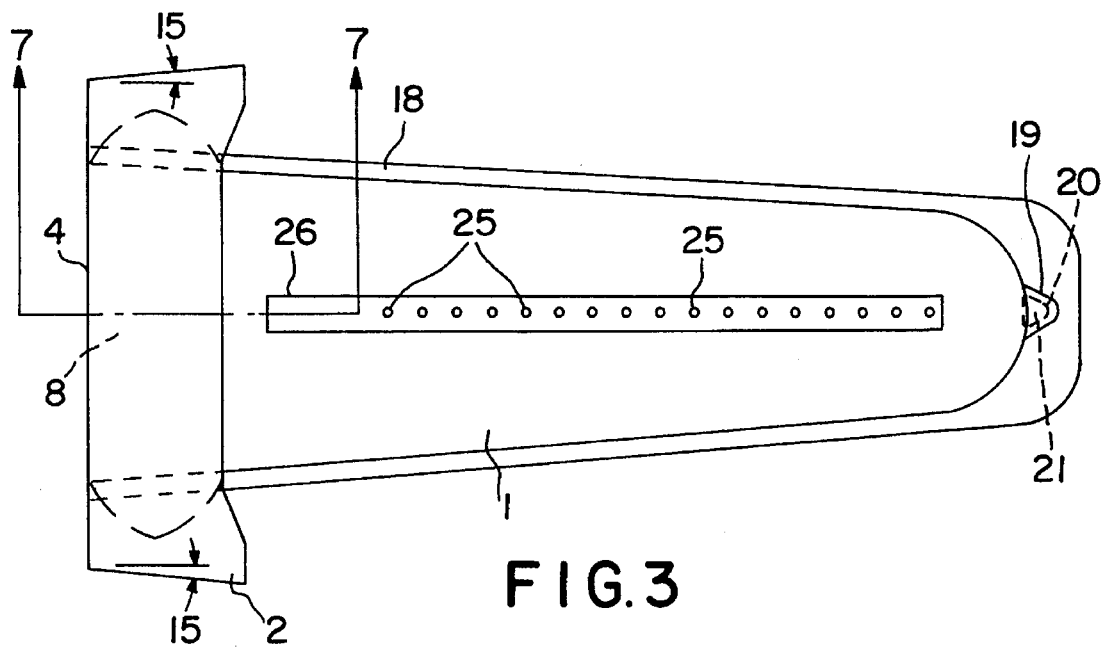
FIG. 3 illustrates a top plan view of the device illustrated by FIGS. 1 and 2.

FIG. 3 illustrates a top plan view of the housing 1 in the embodiments of the invention shown by FIGS. 1 and 2. Removal of the sealing strip 26, at the selection of the user, exposes a plurality of air openings 25 defined in the top surface of the housing. In this manner, a trapped mouse or rodent can be disposed of in a living state by unsealing the openings to permit the trapped animal to breath within the closed housing. Reference numeral 8 generally designates a longitudinally extending center line on the top of the housing, and the air openings 25 are defined along this line. As is also illustrated by FIGS. 1 and 2, the closed end of the housing defines a pocket 19 which is also oriented along the center line 8. The pocket 19 contains therein a selectively rupturable packet 20 housing a gel, a paste, a microsphere, or other attractant 21. When the housing is assembled in its operational state as illustrated by FIG. 1 in which it is upwardly inclined relative to the retaining channel 12, the pocket 19 is squeezed to rupture the packet 20 and release the attractant 21. When released, the attractant tends to induce mice or other rodents to enter the lower, rear opened end 4 of the housing 1. FIG. 3 also illustrates the flange 18 extending around the outer periphery of the housing 1 along the approximate horizontal center of the housing. The flange is provided to discourage mice or other rodents from climbing atop the outside of the housing and causing the housing to disengage from the retaining channel before the animal enters the opened end of the housing.

FIG. 3 further illustrates that the spring 2 is provided with angled outer edges 15 to enable the spring to rest directly on the surface 16 of the retaining channel 12, and to permit the housing to be movably and removably mounted to the retaining channel 12 at the upwardly inclined angle designated by reference numeral 17 in FIG. 1. This orientation between the inclined housing and the retaining channel permits the housing to pivot or rotate downwardly relative to the retaining channel as a result of weight of a mouse entering the opened end of the housing, causing the rear edge 24 of the spring to disengage from the retaining channel and sealing closed the opened end 4 of the housing as a result of the now unopposed resilient force of the spring 2.

Figure 4:
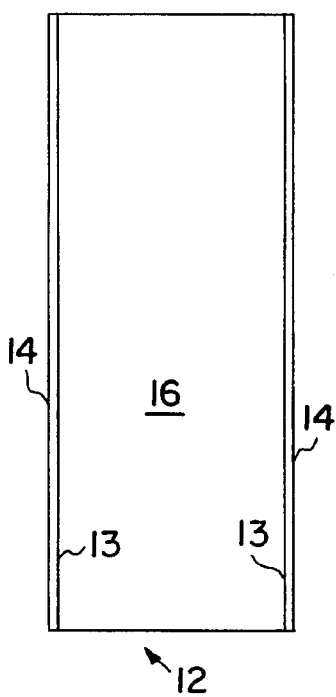
FIG. 4 illustrates a top plan view of a base for supporting the housing in accordance with the present invention.
Figure 5:
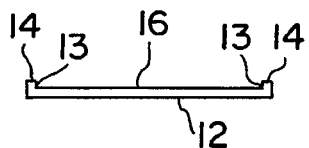
FIG. 5 illustrates a sectional view taken through the base illustrated by FIG. 4.

FIG. 4 illustrates the supporting element or retainer channel 12 as shown in FIGS. 1 and 2. The retainer channel includes an upper planar surface 16 which is substantially rectangular in configuration and extends in a longitudinal direction, and two opposed longitudinally extending, upwardly oriented vertical protrusions or sidewalls 14. Reference numeral 13 designates the inner surfaces of the upwardly extending opposed protrusions 14. FIG. 5 illustrates a sectional view taken through FIG. 4 showing the substantial vertical orientation of the upwardly extending protrusions 14 relative to the longitudinally extending planar upper surface 16 of the retaining channel, and further illustrates the height to which the opposed side protrusions extend relative to the upper surface 16 of the retaining channel.

Figure 6:
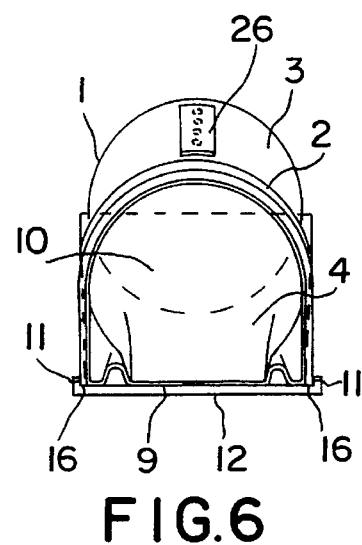
FIG. 6 illustrates a rear elevational view of the device mounted in its operative position as illustrated by FIG. 1.

FIG. 6 illustrates a rear elevational view of the device in accordance with the present invention in its operative position illustrated by FIG. 1. The housing 1 is movably and removably mounted on the retaining channel 12 and oriented at an inclined, upwardly extending angle relative to the planar upper surface 16 of the retaining channel 12. The removable sealing tape 26 remains affixed to the upper surface of the housing 1 to close the vent openings defined therein. The spring 2, which is mounted to the housing 1 proximate to the rear opened end 4 thereof, includes two opposed downwardly extending spring edges 11 which are maintained by frictional engagement against the respective inner surfaces 13 of the opposed vertical protrusions 14 extending upwardly from the retaining channel 12. The retaining channel 12 may be formed from any rigid material, preferably a hard plastic. As a result of the engagement between the side surfaces 13 of the retaining channel and the side edges 11 of the spring 2, the rear end of the housing 1, proximate to the open end 4 thereof, causes the upper half 3 of the housing 1 to flex into a generally arcuate shape, providing an entrance opening at the rear end of the housing. The housing 1 is preferably formed from a soft flexible tube made from polyethylene or vinyl, and the spring 2 is fabricated from spring steel or flexible plastic such as nylon or other such material that will not lose spring return memory. The spring 2 is permanently fixed to the upper half of tube 1 proximate to the rear opened end 4 by conventional bonding methods.

In the operative position illustrated by FIG. 6, the housing 1 is set into a "U-shaped" configuration by flexing the spring 2 and retaining the spring in its flexed position as a result of engagement with the retaining channel. In this position, the lower housing section 9 is forced substantially flat against the upper planar surface 16 of the retaining channel by the resilient forces of the spring 2 and the opposed forces of the protrusions 14, to maintain the rear end 4 of the housing in an opened position to define an opened tubular passageway 10 within the housing 1.

Figure 7:
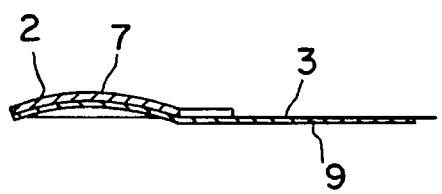
FIG. 7 illustrates a section taken through directional arrows 7—7 of FIG. 3.
Figure 8:
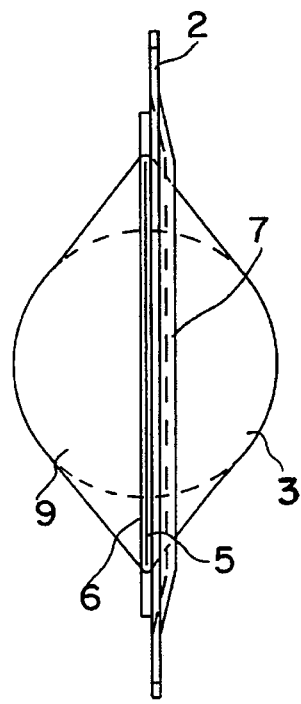
FIG. 8 illustrates a sectional view through the housing when the opened end of the housing is closed after actuation of the device.

FIG. 7 illustrates a sectional view taken through directional arrows 7—7 of FIG. 3. FIGS. 7 and 8 illustrate that the spring 2, which is permanently attached to the upper half 3 of the housing 1 proximate to the opened end 4, will, in its normal unflexed spring position, elongate and flatten the open end of the housing forcing the inner surface 5 of the upper housing section 3 to lie flat and flush against the inner surface 6 of the lower housing section 9 to close and seal the rear end of the housing. The curved segment 7 of the spring 2, as shown in cross section, curves the upper half section 3 of the housing 1, forcing the lower half section 9 of the housing 1 to follow the same contour, thereby assuring a firm seal between the respective internal surfaces 5 and 6 as illustrated by FIG. 8.

In accordance with the invention described above, the device is assembled into its operative position by movably and removably mounting the housing 1 in its forwardly extending inclined position relative to the retaining channel 12, as illustrated by FIG. 1. In this position, the side edges 11 of the spring 2 are flexed by the side protrusions 14 extending upwardly from the opposed side edges of the retaining channel to maintain end 4 of the housing 1 in an opened position. The device is then actuated by squeezing the pocket 19 at the opposed closed end of the housing, causing the packet 20 to rupture and releasing the attractant 21. Mice or other rodents are induced by the released attractant to enter the opened end 4 of the housing and advance in a direction into the passageway 10 towards the attractant at the forward end of the housing. The weight of the travelling animal within the passageway 10 causes the inclined housing to rotate or pivot downwardly towards the retaining channel along the pivot region 23 of the housing (see FIGS. 1 and 2). As the housing 1 pivots downwardly, the end 24 of the spring 2 affixed to the rear end of the housing is raised above the opposed side protrusions 14 of the retaining channel 12, thereby removing the opposed force applied by the retaining channel to the side edges of the spring. The unopposed resilient force of spring 2 causes the spring to assume its non-flexed state and seal the inner surfaces of the upper and lower section halves 3 and 9 of the housing, closing the end 4 of the housing, entrapping the animal in the passageway 10 within the housing.

FIG. 2 illustrates the end 24 of the spring 2 in the pivoted position in which it is raised above the side protrusions 14 of the retaining channel 12. The spring is mounted and oriented relative to the housing such that downward pivotal movement of the housing relative to the retaining channel raises the spring end 24 a sufficient height to elevate the spring end above the opposed protrusions of the retaining channel to remove the application of the flexing force on the spring by the opposed protrusions.

Several options are available to dispose of the the animal entrapped within the housing 1, when the housing is disengaged from the retaining channel 12. In the first instance, the animal and the housing may be disposed of together by removing the housing from the retaining channel without removing the seal 26, which will cause the animal to suffocate. As a further option, the sealing tape 26 can be removed from the top of the housing to expose the breathing openings, and thereafter the entrapped animal can be released live when the housing is removed to an appropriate location. It is apparent that the device of the present invention conceals the entrapped animal from view, and provides means for disposing of the same without direct contact. Additionally, the entrapped animal is disposed of in a humane manner, and is not subject to physical mutilation as it would be with many conventional devices.

It is also apparent that the device of the present invention includes several different manufacturing parameters which may be varied to meet differing requirements. For example, the force of the spring mounted to the housing may be varied, the position of the pivot 23 on the housing may be varied, and the relative orientation of the spring, the housing and the elevation of the side protrusions of the retaining channel may be selected to vary the position at which the weight of the animal within the housing will downwardly rotate the housing a sufficient angular distance to result in the closing of the opened end of the housing.

Other variations and modifications within the scope of the invention herein will become apparent to those skilled in the art. Accordingly, the above discussion is intended to be illustrative only, and not restrictive of the scope of the invention, that scope being defined by the following claims and all equivalents thereto.

I claim:

1. A device for entrapping animals, said device comprising:

a housing defining a first openable end for permitting an animal to enter said housing;

said housing comprising means for selectively closing said first end of said housing;

a supporting element for movably mounting said housing thereon, said housing including means cooperating with said supporting element for mounting said housing at a preselected, inclined angular orientation relative to said supporting element such that said supporting element engages said means for closing said first end of said housing; said housing and said supporting element being separable from each other;

said means for selectively closing said first end of said housing being actuated by predetermined movement of said housing relative to said supporting element for disengaging said supporting element from said means for closing said first end of said housing;

said housing, said supporting element, and said means for selectively closing said first end of said housing being operatively associated such that the weight of an animal entering said housing through said first end thereof causes said predetermined movement of said housing relative to said supporting element to disengage said supporting element from said means for closing said first end of said housing to actuate said means for closing said first end of said housing.

2. The device as claimed in claim 1 wherein said means for selectively closing said first end of said housing includes a spring operatively associated with said housing proximate to said first end of said housing for exerting a resilient force in a direction to close said first end.

3. The device as claimed in claim 1 wherein said housing is configured in a generally tubular shape.

4. The device as claimed in claim 1 further including means associated with said housing for selectively releasing an attractant.

5. The device as claimed in claim 4 wherein said housing defines compartment means for storing and selectively releasing said attractant.

6. The device as claimed in claim 1 wherein said housing moves relative to said supporting element along a pivot region, and said predetermined movement of said housing relative to said supporting element causes said housing to be disengaged from said supporting element.

7. The device as claimed in claim 1 further including a flange mounted around an outer surface of said housing.

8. The device as claimed in claim 1 further including at least one opening defined in said housing.

9. The device as claimed in claim 8 further including means for selectively sealing said at least one opening defined in said housing.

10. A device for entrapping animals, said device comprising:

a housing defining a first openable end for permitting an animal to enter said housing;

said housing comprising means for selectively closing said first end of said housing;

a supporting element for movably mounting said housing thereon, said housing including means cooperating with said supporting element for mounting said housing at a preselected, inclined angular orientation relative to said supporting element;

said means for selectively closing said first end of said housing including a spring operatively associated with said housing proximate to said first end of said housing for exerting a resilient force in a direction to close said first end;.

said supporting element including means for opposing the resilient force of said spring to maintain said first end of said housing in an opened position when said housing is mounted in said inclined angular orientation relative to said supporting element;

said means for selectively closing said first end of said housing being actuated by predetermined movement of said housing relative to said supporting element;

said housing, said supporting element, and said means for selectively closing said first end of said housing being operatively associated such that the weight of an animal entering said housing through said first end thereof causes said predetermined movement of said housing relative to said supporting element to actuate said means for closing said first end of said housing.

11. The device as claimed in claim 10 wherein said means for opposing said resilient force of said spring includes opposed, upwardly extending protrusions on said supporting element for engaging said spring on said housing.

12. The device as claimed in claim 11 wherein said protrusions on said supporting element are adapted to engage said spring in a friction fitting relationship.

13. The device as claimed in claim 11 wherein said supporting element comprises a retaining channel defined by a substantially planar, longitudinally extending base surface from which said opposed vertical protrusions extend in an upward direction.

14. The device as claimed in claim 11 wherein the spring is configured such that said housing is oriented at said inclined angle relative to said supporting element when said spring is engaged by said means for opposing said resilient force of said spring by said supporting element.

15. A device for entrapping animals, said device comprising:

a longitudinally extending housing defining a first openable end for permitting an animal to enter into said housing;

a spring operatively associated with said housing and positioned proximate to said first end for selectively closing said first end of said housing as a result of resilient forces applied by said spring on said housing;

a supporting element for movably mounting said housing thereon, said supporting element comprising means for engaging said spring and opposing the resilient forces exerted by said spring for maintaining said first end of said housing opened when said housing is mounted on said supporting element; said housing being separable from said supporting element;

said housing and said spring being configured such that said housing extends in an upwardly inclined orientation relative to said supporting element when said housing is mounted to said supporting element, said housing defining a pivot axis for movement thereof relative to said supporting element as a result of the weight of an animal entering into said housing through said first end;

said housing, said spring, and said supporting element being operatively associated and arranged such that predetermined movement of said housing relative to said supporting element causes said spring to disengage and be removed from said supporting element for actuating said spring to close said first end of said housing for entrapping an animal therein.

16. A method for entrapping animals within a housing, said method comprising the steps of:

removably mounting a housing having a first open end defined thereon to a supporting element at a predetermined, inclined angular orientation relative to said supporting element such that the first open end of said housing is engaged on said supporting element and is maintained in an opened position;

moving said inclined housing relative to said supporting element as a result of the weight of an animal entering said housing through said first open end; and closing said open end of said housing after said housing moves a predetermined distance relative to said supporting element to disengage said housing from said supporting element.

17. The method as claimed in claim 16 further including the step of closing said first open end of said housing by applying a resilient force to said housing proximate to said first open end when said housing has been moved said predetermined distance relative to said supporting element.

18. The method as claimed in claim 16 further including the step of releasing an attractant from said housing for inducing animals to enter said housing through said first open end thereof.

19. The method as claimed in claim 16 further including the step of selectively unsealing at least one opening defined in said housing after said first end thereof has been closed and said animal is entrapped within said housing.

20. The device as claimed in claim 16 further including the step of removing said housing and disposing of an animal entrapped therein after said housing has moved said predetermined distance relative to said supporting element and said first end has closed.

* * * * *